(12) United States Patent
Kung et al.

(10) Patent No.: US 6,384,811 B1
(45) Date of Patent: May 7, 2002

(54) PORTABLE COMPUTER HAVING A DISPLAY MODULE MOVEABLE AMONG CLOSED, KEYBOARD TYPING AND IMAGE VIEWING POSITIONS

(75) Inventors: Shao-Tsu Kung; Ming-Shen Sun, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/327,376

(22) Filed: Jun. 8, 1999

(51) Int. Cl.[7] .................................................. G09G 5/00
(52) U.S. Cl. ........................ 345/168; 345/905; 361/681; 361/683
(58) Field of Search ................................ 345/168–169, 345/905; 361/680, 681, 683, 687; 312/223.1–223.6

(56) References Cited

U.S. PATENT DOCUMENTS

| | | | |
|---|---|---|---|
| 5,255,214 A | * 10/1993 | Ma | 361/680 |
| 5,383,138 A | * 1/1995 | Motoyama et al. | 361/683 |
| 5,646,818 A | * 7/1997 | Hahn | 361/681 |
| 6,266,236 B1 | * 7/2001 | Ku et al. | 361/681 |

* cited by examiner

Primary Examiner—Richard Hjerpe
Assistant Examiner—Frances Nguyen
(74) Attorney, Agent, or Firm—Pillsbury Winthrop LLP

(57) ABSTRACT

A portable computer includes a display module having a panel mounting side provided with a display panel, a main frame module having a keyboard mounting side provided with a keyboard, and a pivot unit interconnecting pivotally lateral sides of the display module and the main frame module about a first pivot axis located at an intermediate section of the lateral sides of the display module, and about a second pivot axis located at a rear end portion of the lateral sides of the main frame module. As such, the display module is movable among a closed position, where the display module is disposed on top of the main frame module with the display panel facing downwardly and covering the keyboard, a standard keyboard typing position, where the display panel forms an angle with the keyboard, and an image viewing position, where the display module is disposed on top of the main frame module and covers the keyboard with the display panel facing upwardly.

8 Claims, 7 Drawing Sheets

PORTABLE COMPUTER HAVING A DISPLAY MODULE MOVEABLE AMONG CLOSED, KEYBOARD TYPING AND IMAGE VIEWING POSITIONS

BACKGROUND OF THE INVENTION

1. Field of the Invention

The invention relates to a portable computer, more particularly to one having a display module that is movable among closed, keyboard typing and image viewing positions.

2. Description of the Related Art

FIG. 1 illustrates a conventional portable computer that includes a display module 10, a main frame module 12 and a pivot unit 14. The pivot unit 14 interconnects pivotally a side edge of the display module 10 and a side edge of the main frame module 12 about a pivot axis such that the display module 10 is movable relative to the main frame module 12 between a closed position, where the display module 10 is disposed on top of the main frame module 12 with a display panel 100 on the display module 10 facing downwardly and covering a keyboard 120 on a top surface of the main frame module 12, and a keyboard typing position, where the display panel 100 forms an angle with the keyboard 120. Some of the drawbacks of the conventional portable computer are as follows:

1. When typing characters with the use of the keyboard 120, the location of the hands and the viewing angle of the eyes are fixed at non-natural postures.
2. The main frame module 10, which includes the keyboard 120, is often obstructive when the portable computer is used only for browsing the Internet via touch control or pen control.

SUMMARY OF THE INVENTION

Therefore, the object of the present invention is to provide a portable computer of an ergonomic design that has a display module movable among closed, keyboard typing and image viewing positions so as to overcome the aforesaid drawbacks commonly associated with the prior art.

According to this invention, a portable computer comprises a display module, a main frame module and a pivot unit. The display module has two lateral sides and a panel mounting side provided with a display panel. The main frame module has two lateral sides and a keyboard mounting side provided with a keyboard. The pivot unit interconnects pivotally the lateral sides of the display module and the main frame module about a first pivot axis located at an intermediate section of the lateral sides of the display module, and about a second pivot axis located at a rear end portion of the lateral sides of the main frame module and parallel to the first pivot axis to permit movement of the display module among a closed position, where the display module is disposed on top of the main frame module with the display panel facing downwardly and covering the keyboard, a standard keyboard typing position, where the display panel forms an angle with the keyboard, and an image viewing position, where the display module is disposed on top of the main frame module and covers the keyboard with the display panel facing upwardly.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
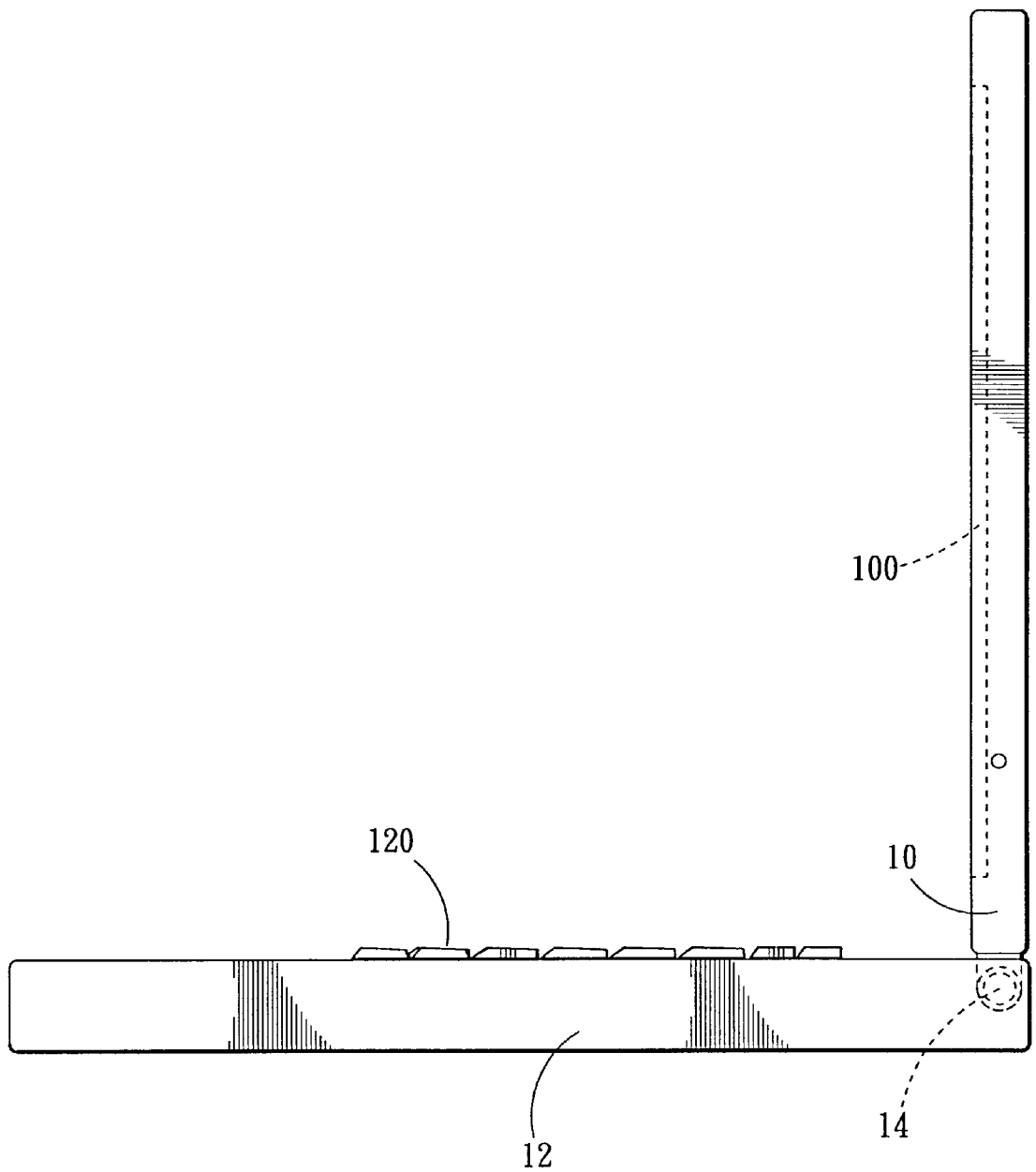
FIG. 1 is a schematic side view illustrating a conventional portable computer.
Figure 2:
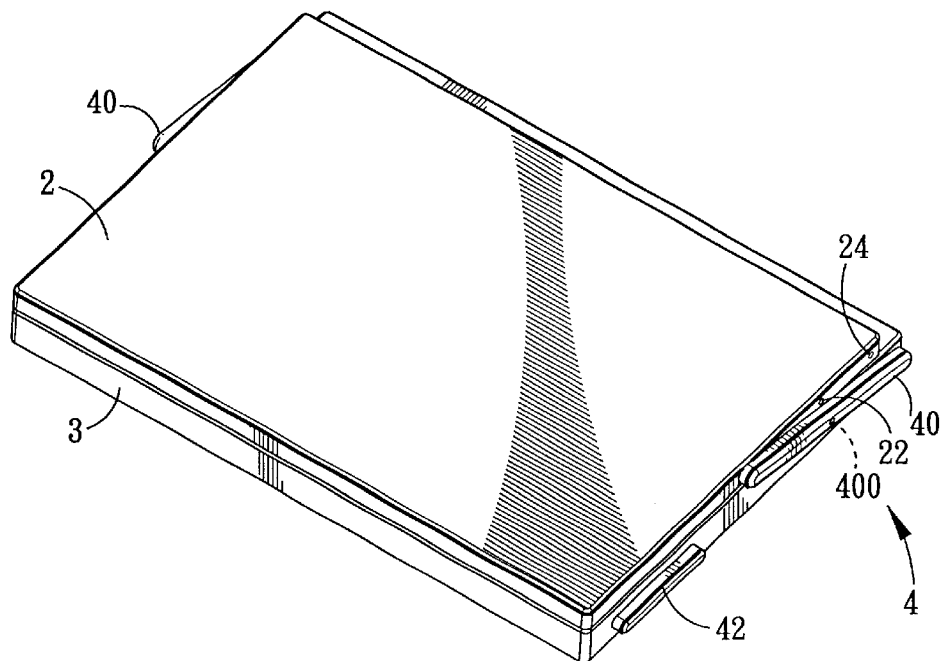
FIG. 2 is a perspective view of the preferred embodiment of a portable computer according to the present invention, illustrating a display module thereof in a closed position.
Figure 3:
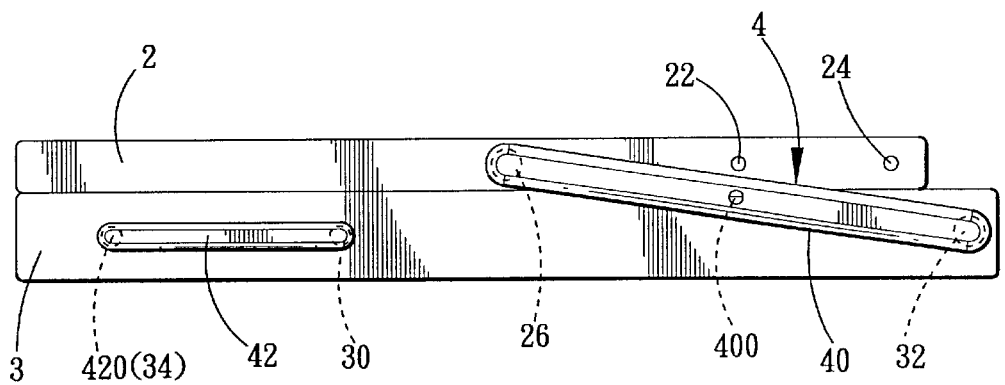
FIG. 3 is a schematic side view of the preferred embodiment, illustrating the display module thereof in the closed position.

Referring to FIGS. 2 and 3, the preferred embodiment of a portable computer according to the present invention is shown to comprise a display module 2, a main frame module 3 and a pivot unit 4.

Figure 4:
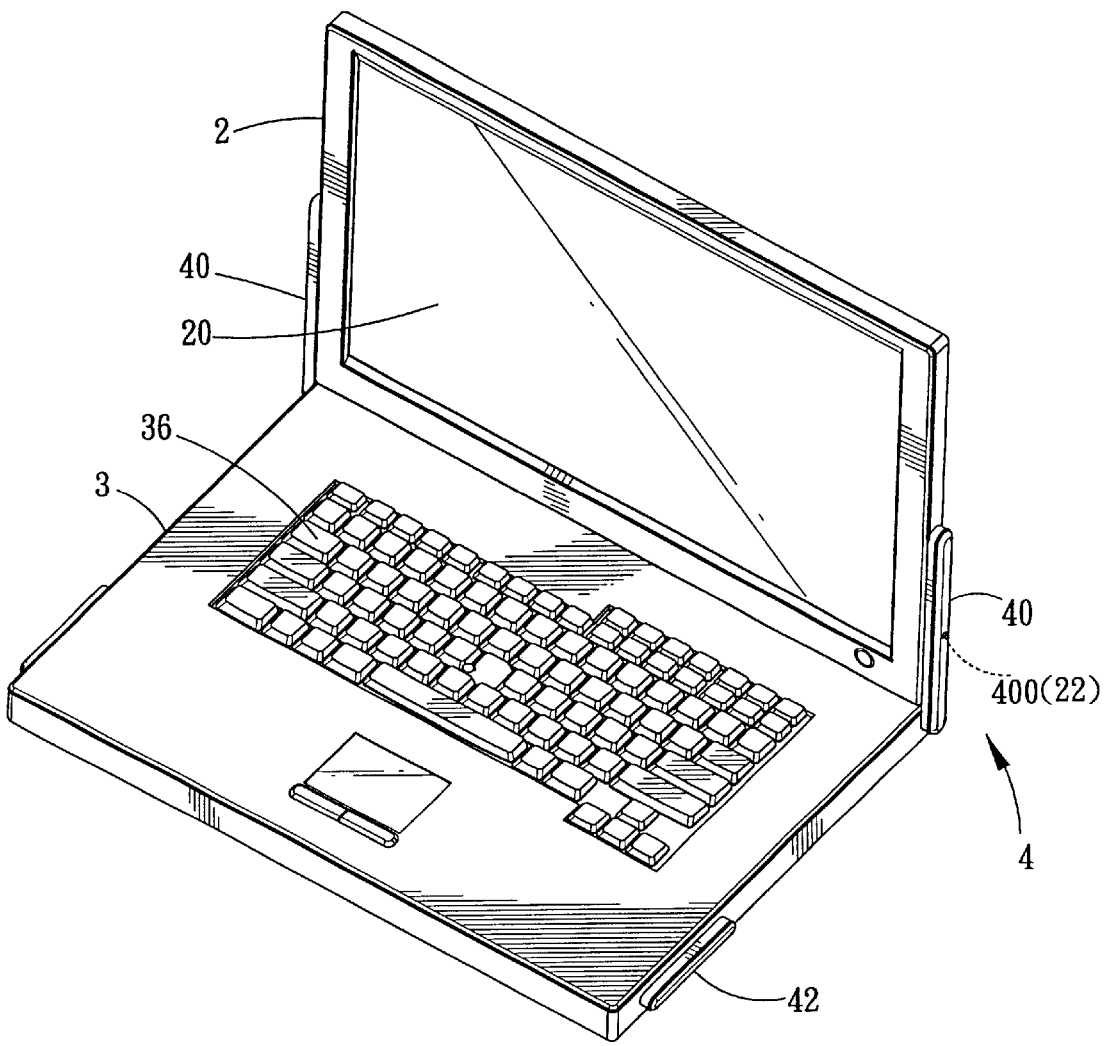
FIG. 4 is a perspective view of the preferred embodiment, illustrating the display module thereof in a standard keyboard typing position.

The display module 2 has two lateral sides and a panel mounting side provided with a display panel 20 (see FIG. 4). Each of the lateral sides of the display module 2 has a rear portion formed with a locking hole 22 and an engaging hole 24. The engaging hole 24 is disposed proximate to a rear edge of the display module 2 relative to the locking hole 22. Each of the lateral sides of the display module 2 further has an intermediate portion provided with a first pivot retainer 26.

The main frame module 3 has two lateral sides and a keyboard mounting side provided with a keyboard 36. Each of the lateral sides of the main frame module 3 has rear and front end portions provided respectively with second and third pivot retainers 32, 30. The front end portion of each of the lateral sides of the main frame module 3 further has a retaining hole 34 proximate to a front edge of the main frame module 3 relative to the third pivot retainer 30.

The pivot unit 4 includes a pair of main support arms or links 40. Each of the main links 40 is disposed adjacent to a respective one of the lateral sides of the display module 2 and the main frame module 3, and has a first end mounted pivotally and frictionally on the display module via the respective first pivot retainer 26, and a second end mounted pivotally and frictionally on the main frame module 3 via the respective second pivot retainer 32. Each of the main links 40 further has an intermediate section with an inner side that is formed with a locking protrusion 400. At least one of the main links 40 is hollow to receive electrical wiring (not shown) for interconnecting electrically the display module 2 and the main frame module 3.

The pivot unit 4 further includes a pair of auxiliary links 42. Each of the auxiliary links 42 is disposed adjacent to a respective one of the lateral sides of the display module 2 and the main frame module 3, and has a first end mounted pivotally and frictionally on the main frame module via the respective third pivot retainer 30, and an opposite second end with an inner side that is formed with a stub 420.

Figure 10:
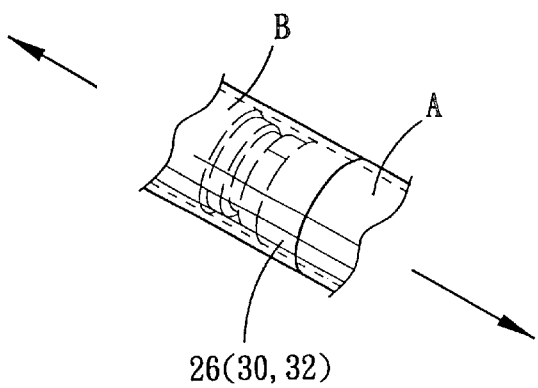
FIG. 10 is a perspective view illustrating a pivot retainer of the preferred embodiment.

FIG. 10 illustrates a known pivot joint that is applicable for use as the first, second and third pivot retainers 26, 32, 30. The pivot joint includes a pair of rotatably and fittingly coupled portions (A), (B), one of which is secured to the display module 2 or the main frame module 3, the other one of which is secured to the main link 40 or the auxiliary link 42. The coupled portions (A), (B) require a large amount of external force to generate relative axial rotation therebetween. Thus, the main links 40 and the auxiliary links 42 can be used to support the display module 2 at a desired angle relative to the main frame module 3. This will be described in greater detail in the succeeding paragraphs.

Referring again to FIGS. 2 and 3, initially, the display module 2 is in a closed position, where the display module 2 is disposed on top of the main frame module 3 with the display panel (not visible) on the display module 2 facing downwardly and covering the keyboard (not visible) on the keyboard mounting side of the main frame module 3. The stub 420 on each of the auxiliary links 42 engages removably and resiliently the retaining hole 34 in the respective lateral side of the main frame module 3 at this time.

Figure 5:
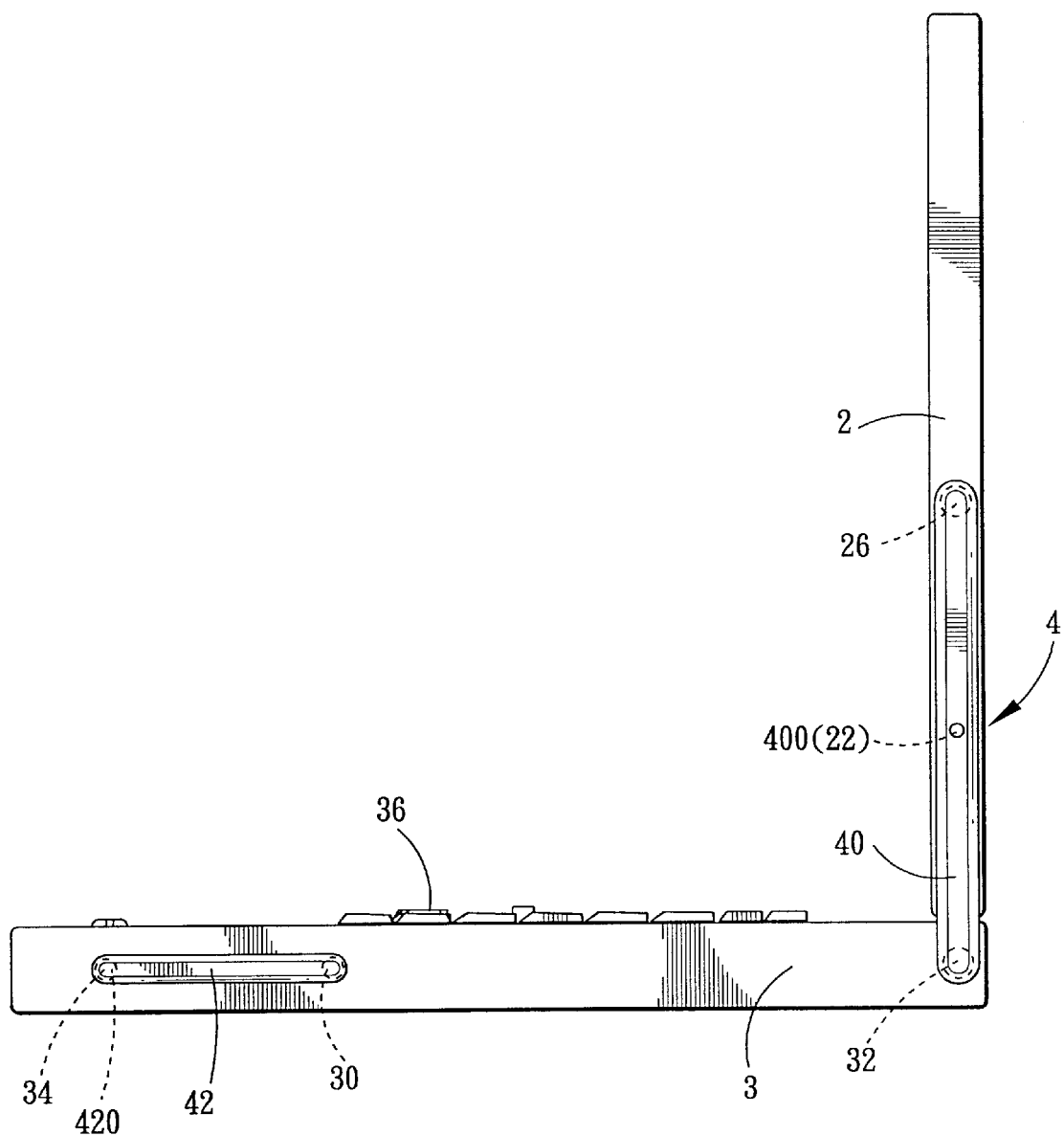
FIG. 5 is a schematic side view of the preferred embodiment, illustrating the display module thereof in the standard keyboard typing position.

By pivoting the main links 40 about a pivot axis defined by the second pivot retainers 32 in a clockwise direction from the closed position, the display module 2 can be moved relative to the main frame module 3 such that the display panel 20 forms an angle of 90° or more with the keyboard 36 on the main frame module 3. The display module 2 can then be pivoted relative to the main links 40 about another pivot axis defined by the first pivot retainers 26 and parallel to the pivot axis defined by the second pivot retainers 32 such that the locking protrusion 400 on each of the main links 40 engages removably and resiliently the locking hole 22 in the respective lateral side of the display module 2. The display module 2 is accordingly disposed in a standard keyboard typing position, as shown in FIGS. 4 and 5.

Figure 6:
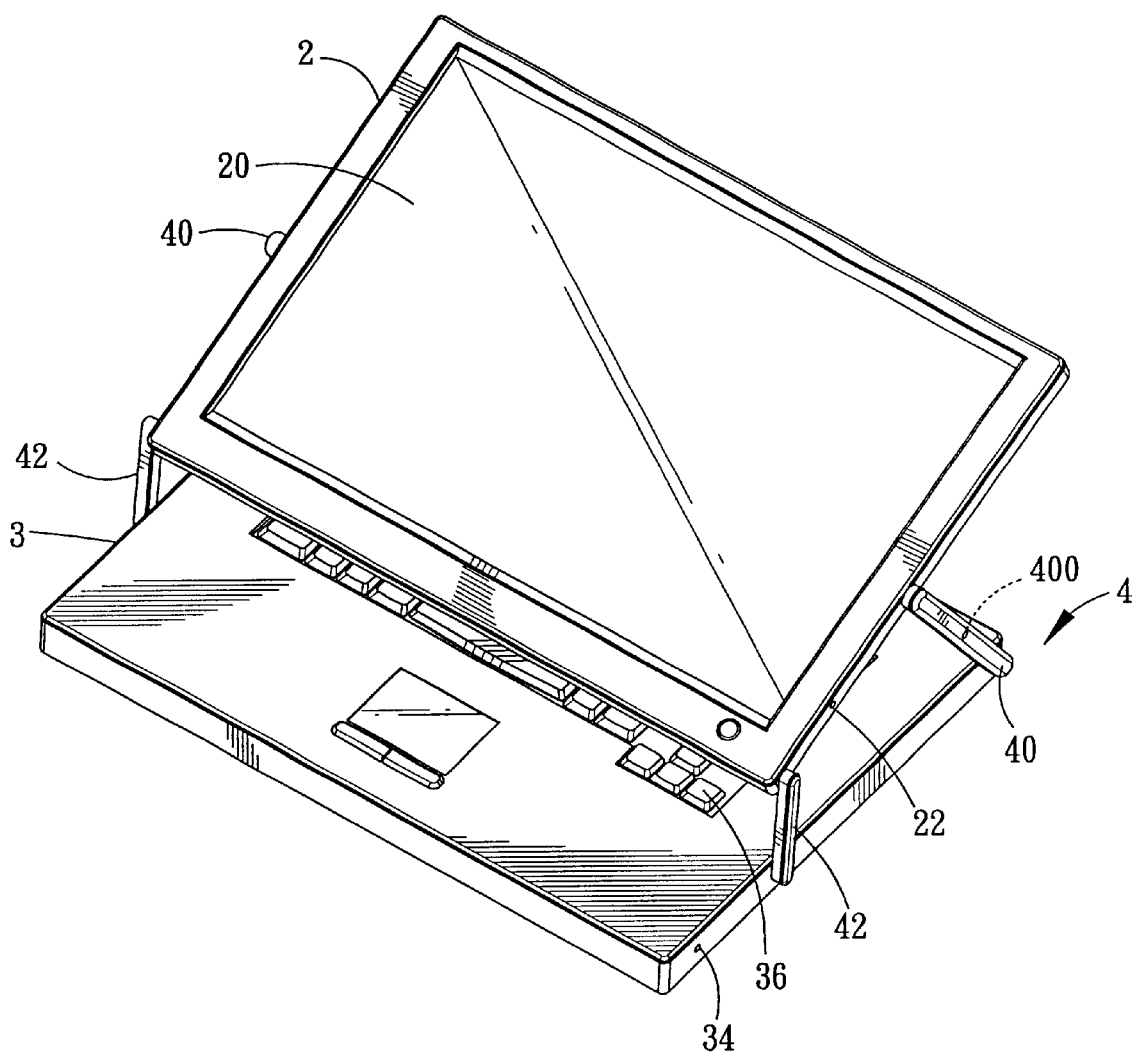
FIG. 6 is a perspective view of the preferred embodiment, illustrating the display module thereof in an ergonomic keyboard typing position.
Figure 7:
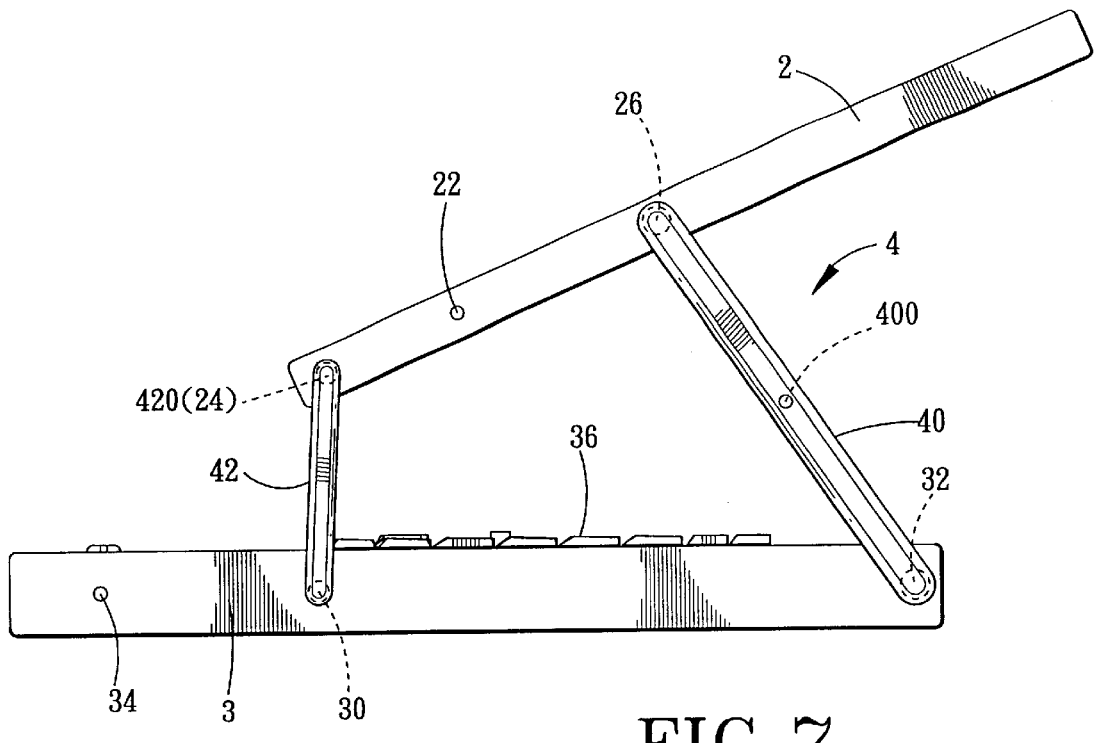
FIG. 7 is a schematic side view of the preferred embodiment, illustrating the display module thereof in the ergonomic keyboard typing position.

For someone who has mastered the locations of the different keys on the keyboard 36, the main links 40 can be pivoted slightly about the pivot axis defined by the second pivot retainers 32 in a counterclockwise direction from the standard keyboard typing position, and the display module 2 can be subsequently pivoted relative to the main links 40 about the pivot axis defined by the first pivot retainers 26, thereby disengaging the locking protrusion 400 on each of the main links 40 from the locking hole 22 in the respective lateral side of the display module 2 such that the display module 2 inclines rearwardly and upwardly relative to and is spaced apart vertically from the main frame module 3 and such that the display panel 20 faces upwardly. At this time, the stub 420 on each of the auxiliary links 42 can be disengaged from the retaining hole 34 in the respective lateral side of the main frame module 3, and the auxiliary links 42 can be pivoted in a clockwise direction about a pivot axis defined by the third pivot retainers 30 and parallel to those defined by the first and second pivot retainers 26, 32 to engage removably and resiliently the stub 420 on each of the auxiliary links 42 with the engaging hole 24 in the respective lateral side of the display module 2, as best illustrated in FIGS. 6 and 7. The display module 2 is accordingly disposed in an ergonomic keyboard typing position, in which the auxiliary links 42 assist the main links 40 in positioning the display module 2 relative to the main frame module 3. When the display module 2 is in the ergonomic keyboard typing position, the display panel 20 faces upwardly, and the hands can be extended in the space formed between the display module 2 and the main frame module 3, such that the location of the hands and the viewing angle of the eyes are accordingly disposed at natural postures.

Figure 8:
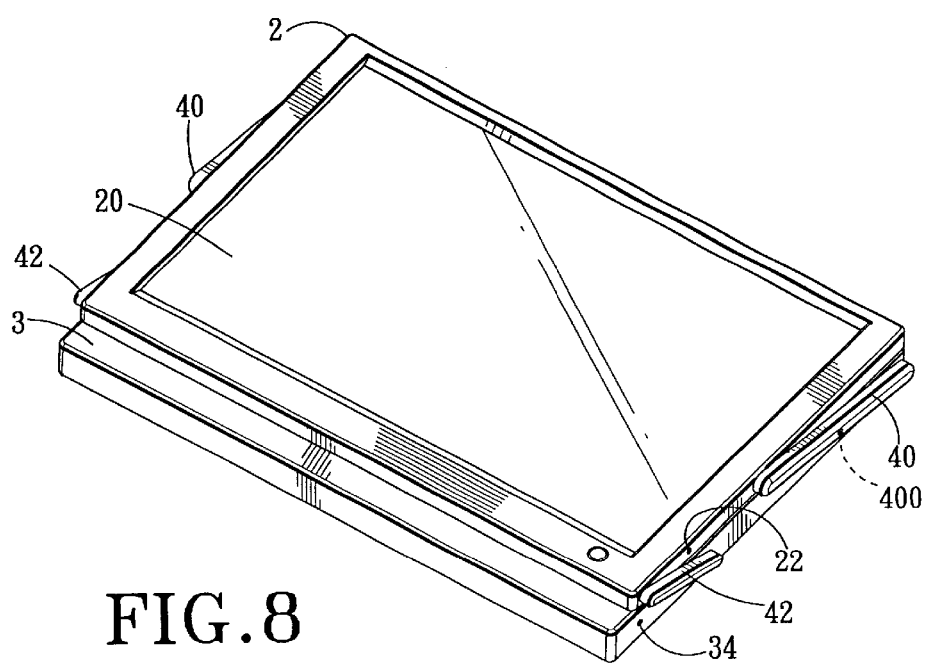
FIG. 8 is a perspective view of the preferred embodiment, illustrating the display module thereof in an image viewing position.
Figure 9:
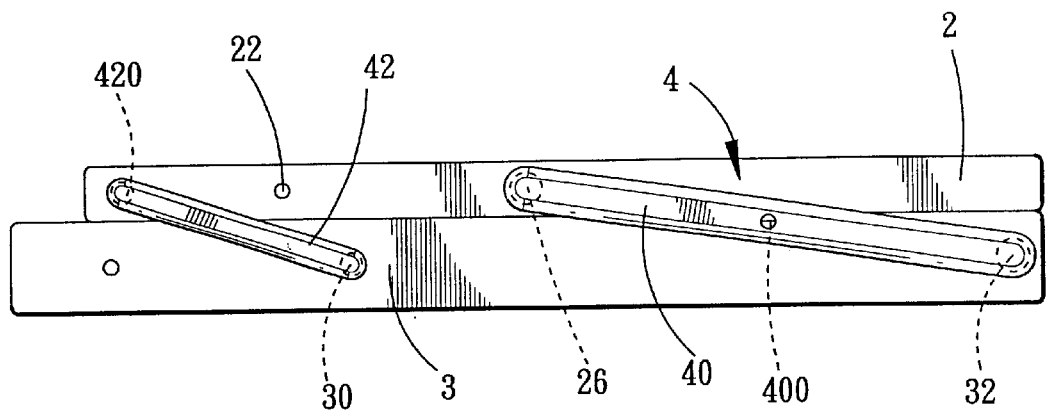
FIG. 9 is a schematic side view of the preferred embodiment, illustrating the display module thereof in the image viewing position.

To move the display module 2 to an image viewing position, as shown in FIGS. 8 and 9, the main links 40 and the auxiliary links 42 are pivoted respectively about the pivot axes defined by the second and third pivot retainers 32, 30 in a counterclockwise direction from the ergonomic keyboard typing position until the display module 2 is disposed on top of the keyboard mounting side of the main frame module 3 and covers the keyboard (not visible) with the display panel 20 facing upwardly. At this time, the portable computer can be used for browsing the Internet via known touch control or pen control techniques without obstruction by the main frame module 3.

In the preferred embodiment, the locking protrusions 400 and the stubs 420 are provided respectively on the main links 40 and the auxiliary links 42. In a modified embodiment, the main links and the auxiliary links are formed with holes to engage removably and resiliently corresponding locking protrusions and stubs formed on the display module and the main frame module to achieve the same effect.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A portable computer comprising:
   a display module having two lateral sides and a panel mounting side provided with a display panel;
   a main frame module having two lateral sides and a keyboard mounting side provided with a keyboard; and
   a pivot unit interconnecting pivotally said lateral sides of said display module and said main frame module about a first pivot axis located at an intermediate section of said lateral sides of said display module, and about a second pivot axis located at a rear end portion of said lateral sides of said main frame module and parallel to the first pivot axis to permit movement of said display model among a closed position, wherein said display module is disposed on top of said main frame module with said display panel facing downwardly and covering said keyboard, a standard keyboard typing position, where said display panel forms an angle with said keyboard, and an image viewing position, where said display module is disposed on top of said main frame module and covers said keyboard with said display panel facing upwardly,
   wherein said pivot unit includes a pair of main links, each of which is disposed adjacent to a respective one of said lateral sides of said display module and said main frame module, each of said main links having a first end pivotally retained on said intermediate section of the respective one of said lateral sides of said display module, and a second end pivotally retained on said rear end portion of the respective one of said lateral sides of said main frame module.

2. The portable computer as claimed in claim 1, wherein said intermediate section of each of said lateral sides of said display module is provided with a first pivot retainer for mounting pivotally and frictionally said first end of the respective one of said main links thereon, and said rear end portion of each of said lateral sides of said main frame module is provided with a second pivot retainer for mounting pivotally and frictionally said second end of the respective one of said main links thereon, thereby enabling said main links to support said display module at a desired angle relative to said main frame module.

3. The portable computer as claimed in claim 1, wherein one of rear portions of said lateral sides of said display module and said main links is formed with a locking hole, and the other one of said rear portions of said lateral sides of said display module and said main links is formed with a locking protrusion for engaging removably and resiliently said locking hole when said display module is in the standard keyboard typing position.

4. The portable computer as claimed in claim 1, wherein said pivot unit further includes a pair of auxiliary links, each of which is disposed adjacent to a respective one of said lateral sides of said display module and said main frame module, each of said auxiliary links having a first end pivotally retained on a front end portion of the respective one of said lateral sides of said main frame module about a third pivot axis parallel to the first and second pivot axes, and a second end opposite to said first end.

5. The portable computer as claimed in claim 4, wherein said front end portion of each of said lateral sides of said main frame module is provided with a pivot retainer for mounting pivotally and frictionally said first end of the respective one of said auxiliary links thereon.

6. The portable computer as claimed in claim 4, wherein one of said lateral sides of said main frame module and said second ends of said auxiliary links is formed with a retaining hole, and the other one of said lateral sides of said main frame module and said second ends of said auxiliary links is formed with a stub for engaging removably and resiliently said retaining hole when said display module is in the closed position.

7. The portable computer as claimed in claim 4, wherein said second end of each of said auxiliary links is engageable removably with a rear portion of the respective one of said lateral sides of said display module when said auxiliary links are pivoted about the third pivot axis to assist said main links in supporting said display module in an ergonomic keyboard typing position, where said display module inclines rearwardly and upwardly relative to and is spaced apart vertically from said main frame module and where said display panel faces upwardly.

8. The portable computer as claimed in claim 7, wherein one of said rear portions of said lateral sides of said display module and said second ends of said auxiliary links is formed with an engaging hole, and the other one of said rear portions of said lateral sides of said display module and said second ends of said auxiliary links is formed with a stub for engaging removably and resiliently said engaging hole when said display module is in the ergonomic keyboard typing position.

* * * * *